(12) United States Patent
Fukano et al.

(10) Patent No.: US 10,709,061 B2
(45) Date of Patent: Jul. 14, 2020

(54) ELECTRIC POWER EQUIPMENT

(71) Applicant: HONDA MOTOR CO., LTD., Tokyo (JP)

(72) Inventors: Jun Fukano, Wako (JP); Masato Takeda, Wako (JP); Keisuke Muraoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 15/815,994

(22) Filed: Nov. 17, 2017

(65) Prior Publication Data

US 2018/0146616 A1    May 31, 2018

(30) Foreign Application Priority Data

Nov. 25, 2016   (JP) .................. 2016-229547

(51) Int. Cl.
| | | |
|---|---|---|
| A01D 34/00 | (2006.01) | |
| A01D 34/69 | (2006.01) | |
| A01D 34/68 | (2006.01) | |
| B60L 50/52 | (2019.01) | |
| A01D 34/78 | (2006.01) | |
| A01D 34/81 | (2006.01) | |
| A01D 69/02 | (2006.01) | |
| A01D 101/00 | (2006.01) | |

(52) U.S. Cl.
CPC ....... *A01D 34/006* (2013.01); *A01D 34/6806* (2013.01); *A01D 34/69* (2013.01); *A01D 34/78* (2013.01); *A01D 34/81* (2013.01); *A01D 69/02* (2013.01); *B60L 50/52* (2019.02); *A01D 2101/00* (2013.01); *B60L 2210/20* (2013.01); *Y02T 10/7258* (2013.01)

(58) Field of Classification Search
CPC .... A01D 34/006; A01D 34/78; A01D 34/662; A01D 34/69; A01D 34/6806; A01D 34/81; A01D 34/64; A01D 69/02; B60L 50/52; B60L 50/66; B60L 58/13; B60L 58/14
USPC ................................. 56/10.2 R, 10.2 H, 16.7
See application file for complete search history.

(56) References Cited

U.S. PATENT DOCUMENTS

| | | |
|---|---|---|
| 5,906,088 A | 5/1999 | Inui et al. |
| 7,594,377 B1 | 9/2009 | Jansen et al. |

(Continued)

FOREIGN PATENT DOCUMENTS

| | | |
|---|---|---|
| EP | 2 111 735 A1 | 10/2009 |
| JP | H05007419 A | 1/1993 |

(Continued)

OTHER PUBLICATIONS

Extended European Search Report issued in European Application No. 17203143.7 dated Apr. 25, 2018, 6 pages.

(Continued)

*Primary Examiner* — Robert E Pezzuto
(74) *Attorney, Agent, or Firm* — Armstrong Teasdale LLP (57) ABSTRACT

Electric power equipment such as a lawn mower is provided with a travel unit driven by a travel motor for propelling the equipment, a work unit driven by a work motor to perform prescribed work such as cutting grass as the equipment travels, and a control unit configured to decrease a rotational speed of the travel motor in response to an increase in a load applied to the work motor, and to increase the rotational speed of the travel motor in response to a decrease in a load applied to the work motor.

4 Claims, 6 Drawing Sheets

(56) References Cited

U.S. PATENT DOCUMENTS

| | | | |
|---|---|---|---|
| 8,572,939 B2* | 11/2013 | Koike | B60K 7/0007 |
| | | | 56/10.2 A |
| 9,686,909 B2* | 6/2017 | Schygge | A01D 34/78 |
| 2012/0227368 A1 | 9/2012 | Koike et al. | |
| 2016/0183451 A1 | 6/2016 | Conrad et al. | |
| 2016/0244925 A1 | 8/2016 | Yuki et al. | |

FOREIGN PATENT DOCUMENTS

| | | |
|---|---|---|
| JP | H09201126 A | 8/1997 |
| JP | H09294453 A | 11/1997 |
| JP | 2007032222 A | 2/2007 |
| JP | 2009296933 A | 12/2009 |
| JP | 2011188756 A | 9/2011 |
| JP | 2012187026 A | 10/2012 |
| JP | 2016156223 A | 9/2016 |

OTHER PUBLICATIONS

English translation of Notice of Reasons for Refusal for JP Application No. 2016-229547, dated Oct. 8, 2019, 4 pages.

\* cited by examiner

ELECTRIC POWER EQUIPMENT

TECHNICAL FIELD

The present invention relates to electric power equipment provided with a work motor for performing a prescribed work, a travel motor for enabling the electric power equipment to travel on a ground surface, and a battery for powering the motors. The electric power equipment may include, not exclusively, lawn mowers, grass trimmer, snow blowers and tillers.

BACKGROUND ART

Various kinds of electric power equipment including wheels for propelling the electric power equipment and a work unit for performing a prescribed work are known in such forms as lawn mowers, snow blowers and tillers. See JPH09-201126A, JP2016-156223A and JP2009-296933A, for instance. Such electric power equipment is typically provided with wheels to propel the equipment, and the work unit performs the prescribed work as the equipment travels forward. The work unit may cut the grass, remove the snow or till the soil depending on the particular application.

In such electric power equipment, the rotational speed of the motor (work motor) for the work unit is usually maintained at a constant value so that an optimum result may be obtained for the given power of the work motor that drives the work unit. However, the load of the work unit may vary for each particular area that is being worked. For instance, in the case of a lawn more, the grass may be taller and/or more dense in some part of the lawn than in other parts. When the load changes, the rotational speed of the rotary blade changes. If the blade rotational speed is excessively low, the grass may be torn or ripped, and this causes an uneven unattractive finish.

SUMMARY OF THE INVENTION

In view of such a problem of the prior art, a primary object of the present invention is to provide electric power equipment fitted with a travel unit and a work unit that allows prescribed work to be performed in a favorable manner.

The present invention achieves such an object by providing electric power equipment (1), comprising: a work unit (3) for performing prescribed work; a work motor (8) for driving the work unit; a travel unit (5) for enabling the electric power equipment to travel on a ground surface; a travel motor (9) for driving the travel unit; and a control unit (10) for controlling operation of the work motor and the travel motor, the control unit being configured to maintain a rotational speed of the work motor at a constant value; wherein the control unit is further configured to decrease a rotational speed of the travel motor in response to an increase in a load applied to the work motor.

Owing to this arrangement, when the load of the work motor is increased, the rotational speed of the travel motor is reduced. By reducing the rotational speed of the travel motor, the amount of work that is required to be performed per unit time by the work motor is reduced, and the increase in the load on the work motor is thereby suppressed. As a result, reduction in the rotational speed of the work motor is prevented. This facilitates maintaining the rotational speed of the work motor to be constant and thereby allows the quality of the work performed by the power equipment to be improved.

According to a preferred embodiment of the present invention, the electric power equipment further comprises a load detection unit (41) for detecting a load acting on the work motor; and the control unit is configured to perform a deceleration control whereby the rotational speed of the travel motor is decelerated at a prescribed deceleration when the detected load is equal to or greater than a deceleration determination value, and when the load has become equal to or smaller than a return determination value that is smaller than or equal to the deceleration determination value during the deceleration control, to perform a return control whereby the rotational speed of the travel motor is returned to a value thereof prior to the preceding deceleration control by accelerating the travel motor at a prescribed acceleration.

Owing to this arrangement, when the load of the work motor is higher than normal, the rotational speed of the travel motor is gradually decreased until the load on the work motor decreases to the return determination value which indicates that the load has adequately decreased. Thereby, the load on the work motor is reduced in a reliable manner. Because the deceleration determination value is substantially greater than the return determination value, the control process can be performed without causing hunting. Also, because the changes in the rotational speed of the travel motor are performed at a prescribed acceleration or deceleration, a sudden acceleration or deceleration can be avoided so that the electric power equipment can be operated in a comfortable manner.

According to a certain aspect of the present invention, the control unit is configured such that when the load has become equal to or greater than a stop determination value that is greater than the deceleration determination value during the deceleration control, the control unit performs a stop control to stop the travel motor, and when the load has become equal to or smaller than the return determination value during the stop control, the control unit performs the return control whereby the rotational speed of the travel motor is returned to the value thereof prior to the preceding deceleration control by accelerating the travel motor at the prescribed acceleration.

Owing to this arrangement, when the load on the work motor is relatively great, the travel motor is stopped altogether so that the load on the work motor is reduced most quickly. After coming to a stop under this circumstance, the travel motor is reactivated once the load has become equal to or smaller than the return determination value.

According to another aspect of the present invention, the control unit is configured such that when the load has become equal to or smaller than a second return determination value that is greater than the return determination value and smaller than the stop determination value during the stop control, the control unit performs a low rotational speed operation control whereby the rotational speed of the travel motor is increased to a prescribed low rotational speed that is lower than the rotational speed thereof prior to the deceleration control.

Thereby, the time period during which the travel motor is stationary under the stop control can be minimized so that the work efficiency of the electric power equipment can be improved.

According to yet another aspect of the present invention, the deceleration determination value comprises a plurality of deceleration determination values, and the deceleration control is performed so that the prescribed deceleration is increased with an increase in the deceleration determination value.

Thereby, the greater the load on the work motor is, the greater the deceleration of the travel motor becomes. Therefore, the load acting on the work motor can be maintained at a constant level with a greater accuracy.

The work unit may comprise a rotary blade (3A) driven by the work motor and form a part of a lawn mower.

Thereby, an uneven finish of the lawn can be avoided.

Also preferably, the control unit is configured to increase the rotational speed of the travel motor in response to a decrease in the load applied to the work motor.

Thereby, when the load of the work motor is low, the rotational speed of the travel motor is increased. By increasing the rotational speed of the travel motor, the amount of work that is required to be performed per unit time by the work motor is increased, and the load on the work motor is thereby increased. As a result, the load on the work motor is in effect kept at a relatively constant level although the load on the work motor would in fact vary from one place to another if the rotational speed of the travel motor were kept constant. By keeping the effective load on the work motor at a constant level, the rotational speed of the work motor can be kept at a constant value easily and the quality of the work can be improved.

Thus, the present invention provides electric power equipment fitted with a travel unit and a work unit that allows prescribed work to be performed in a favorable manner.

DETAILED DESCRIPTION OF THE PREFERRED EMBODIMENT(S)

A walk behind electric lawn mower according to an embodiment of the present invention is described in the following with reference to FIGS. 1 to 5.

Figure 1:
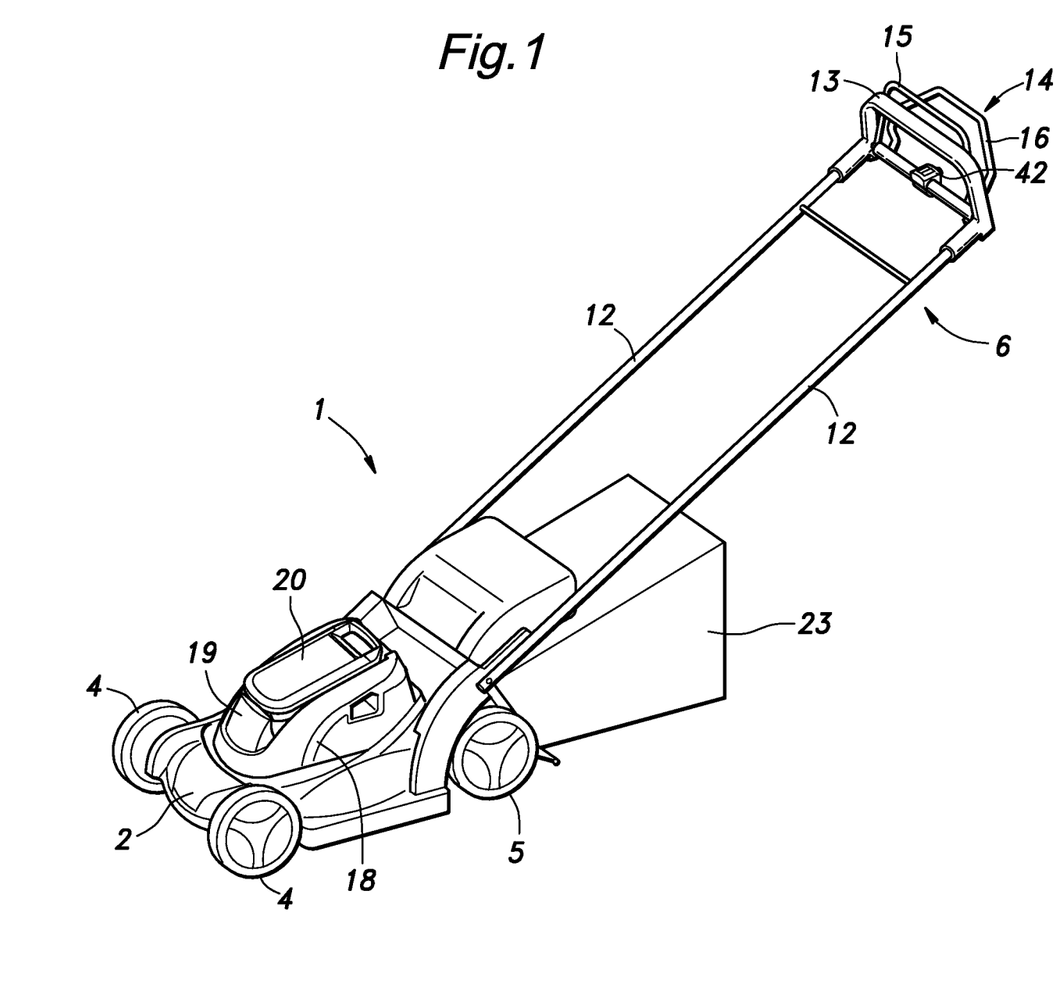
FIG. 1 is a perspective view of a walk behind electric lawn mower according to an embodiment of the present invention.
Figure 2:
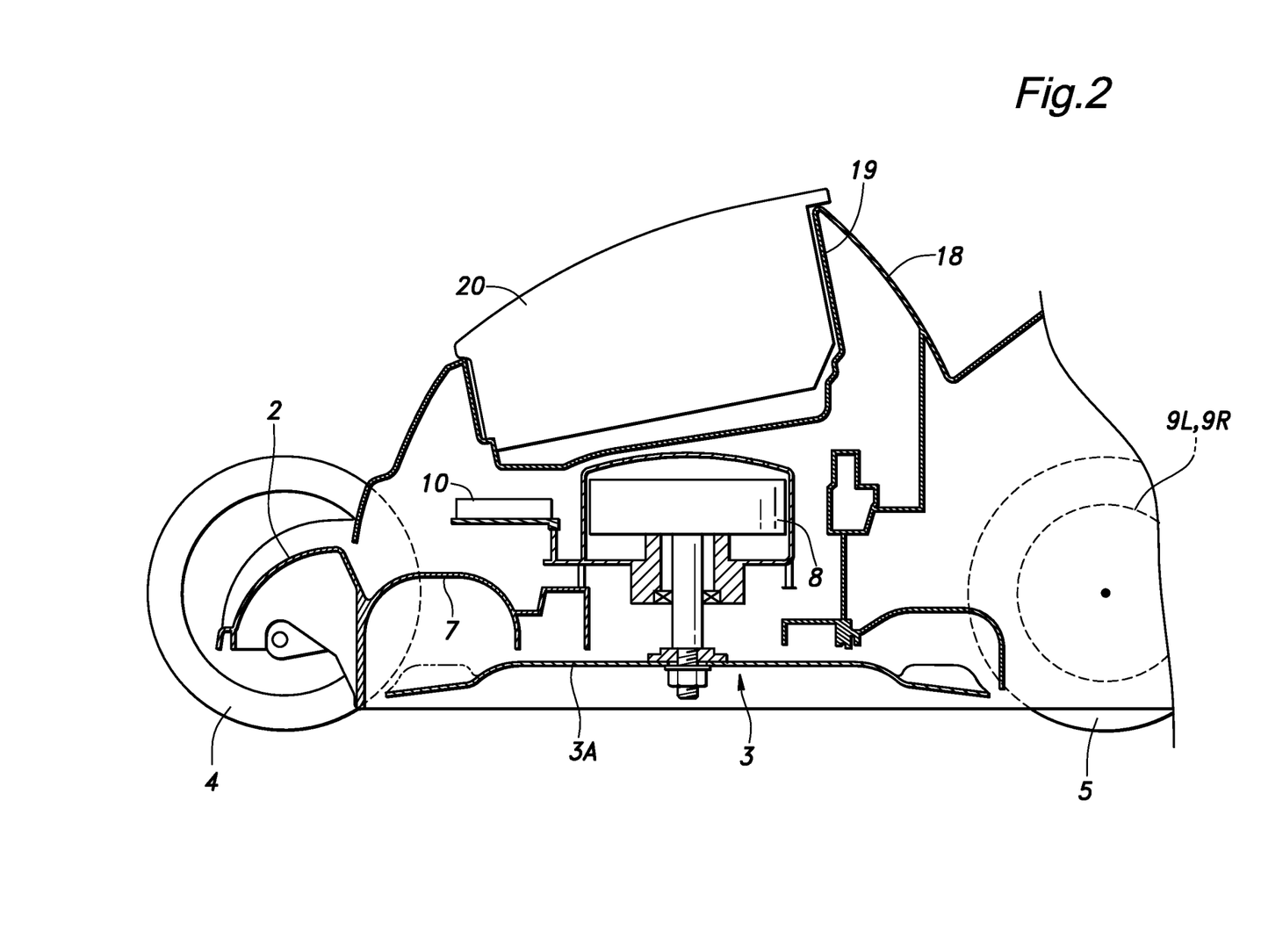
FIG. 2 is a sectional view of the electric lawn mower.

As shown in FIGS. 1 and 2, the electric lawn mower 1 according to the present embodiment includes a main body 2, a work unit 3 provided in a lower part of the main body 2, a pair of front wheels 4, a pair of rear wheels 5, and a handle 6 extending rearward and upward from the main body 2. The work unit 3 is provided with a recess 7 that opens out downward at the center of the lower part of the main body 2 and a blade 3A that is rotatably disposed in the recess 7. The main body 2 is provided with an electric motor 8 having an output shaft supporting the blade 3A, and a pair of electric motors 9L and 9R connected to the left and right rear wheels 5, respectively, for rotating the rear wheels 5. The electric motor 8 for driving the blade 3A is referred to as a work motor 8, and the electric motors 9L and 9R for driving the rear wheels 5 are referred to as travel motors 9 in the following disclosure. The main body 2 is further provided with a control unit 10 for controlling these electric motors 8, 9L and 9R.

The handle 6 includes a pair of side bars 12 extending upward and rearward from either side of the main body 2 and a cross bar grip 13 connected between the rear ends of the side bars 12. The cross bar grip 13 of the handle 6 is provided with an operation input unit 14 for receiving an input operation by an operator. The operation input unit 14 is provided with a travel lever 15 for operating the travel motors 9L and 9R and a work lever 16 for operating the work motor 8.

The upper end of the main body 2 is provided with an upper cover 18 that covers the work motor 8, the left and right travel motors 9L and 9R, and the control unit 10. A battery tray 19 is formed by recessing the upper surface of the upper cover 18 to detachably receive a battery 20 for supplying electric power to the motors 8 and 9 and the control unit 10.

The main body 2 internally defines a passage (not shown) extending from the recess 7 to the rear end of the main body 2, and a grass bag 23 is detachably fitted to an open rear end of the passage. The grass cut by the blade 3A is discharged from the recess 7 to the rear through the passage, and collected in the grass bag 23.

Figure 3:
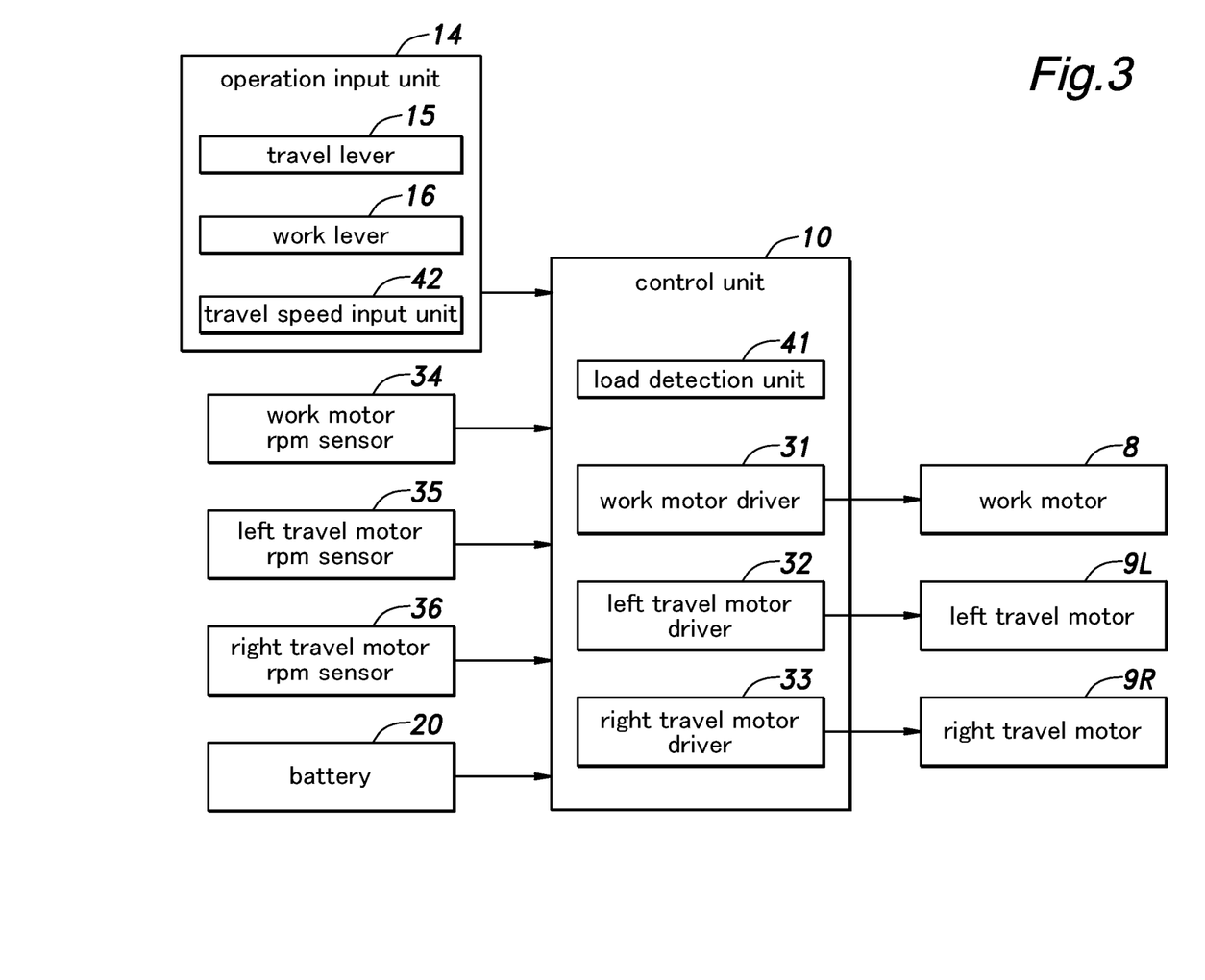
FIG. 3 is a block diagram of a control unit for the electric lawn mower.

The control unit 10 consists of an electronic control circuit (ECU) including a microcomputer, ROM, RAM, a peripheral circuit, an input/output interface, drivers and the like. As shown in FIG. 3, the control unit 10 is connected to the battery 20 and receives power supply from the battery 20. The control unit 10 is provided with motor drivers 31, 32 and 33 corresponding to the work motor 8 and the left and right travel motors 9L and 9R, respectively. The control unit 10 controls the operation of the motors 8, 9L and 9R by controlling the electric power supplied from the battery 20 to the motors 8, 9L and 9R via the motor drivers 31 to 33, for instance as a PWM control process.

The work motor 8 and the left and right travel motors 9L and 9R are provided with respective rotational angle sensors 34, 35 and 36 for detecting the rotational angles of the corresponding motors 8, 9L and 9R. The rotational angle sensors 34, 35 and 36 forward signals corresponding to the rotational angles of the respective motors 8, 9L and 9R to the control unit 10, and the control unit 10 determines the rotational speeds of the motors 8, 9L and 9R according to the signals from the corresponding rotational angle sensors 34, 35 and 36.

The control unit 10 is provided with a load detection unit 41 that detects a work motor load L [N·m] acting upon the work motor 8. The load detection unit 41 may detect the work motor load L based on the current (load current) flowing through the work motor 8, for instance. The load detection unit 41 may use the value of the current (load current value [A]) supplied to the work motor 8 as representing the work motor load L. In another embodiment, the magnetostrictive torque sensor is affixed to the output shaft of the work motor 8 which is fitted with the blade 3A so that the load detection unit 41 may detect the work motor load L from the output signal of the magnetostrictive torque sensor.

The travel lever 15 and the work lever 16 are each pivotally attached to the handle 6 so as to be moveable between an initial position where the lever 15, 16 is separated from the cross bar grip 13 of the handle 6, and an operation position where the lever 15, 16 is brought close to the cross bar grip 13 of the handle 6. The operation input unit 14 outputs a travel ON signal to the control unit 10 when the travel lever 15 is in the operation position, and outputs a blade ON signal to the control unit 10 when the work lever 16 is in the operation position.

The operation input unit 14 is provided with a travel speed input unit 42 for accepting an input operation by an operator regarding the travel speed of the electric lawn mower 1. The travel speed input unit 42 may consist of a lever, a dial, or the like that can be displaced with respect to the main body of the operation input unit 14, and the operation input unit 14 outputs a signal corresponding to the position of the travel speed input unit 42 to the control unit 10. Based on the signal from the operation input unit 14, the control unit 10 acquires a commanded rotational speed Vr [rpm] of the travel motors 9L and 9R corresponding to the travel speed desired by the operator.

Figure 4:
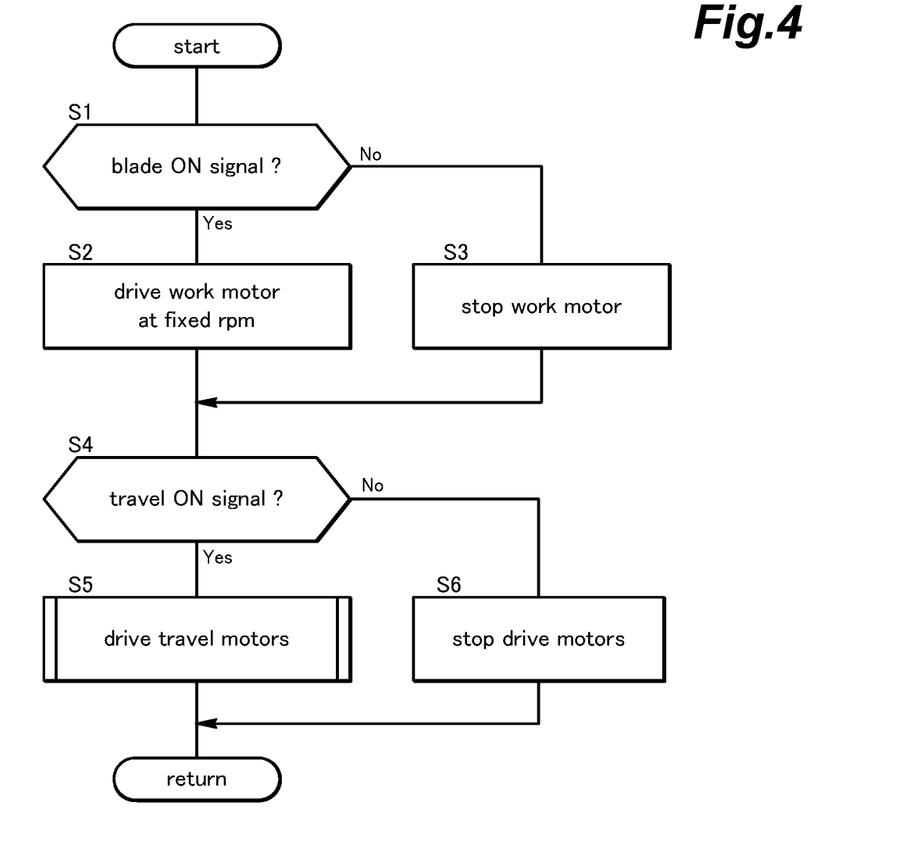
FIG. 4 is flow chart showing a control process performed by the control unit.

The mode of operation of the control unit 10 is described in the following with reference to FIGS. 4 and 5. As shown in FIG. 4, the control unit 10 awaits for a blade ON signal in step S1, and when a blade ON signal is received, the control unit 10 controls the work motor driver 31 accordingly or starts driving the work motor 8 in step S2. At this time, the control unit 10 performs a feedback control such that the rotational speed of the work motor 8 is maintained at a predetermined rotational speed VB (corresponding to the commanded rotational speed Vr selected at the travel speed input unit 42) according to the signal from the work motor rotational angle sensor 34. When no blade ON signal is received, the control unit 10 stops the work motor 8 or keeps the work motor 8 stationary in step S3. In either case, the control flow proceeds to step S4.

In step S4 that follows step S2 or step S3, the control unit 10 awaits for a travel ON signal. When no travel ON signal is received in step S4, the control unit 10 proceeds to step S6 to stop the travel motors 9L and 9R or keep the travel motors 9L and 9R stationary. Upon receiving a travel ON signal in step S4, the control unit 10 drives the travel motors 9L and 9R in step S5.

Figure 5:
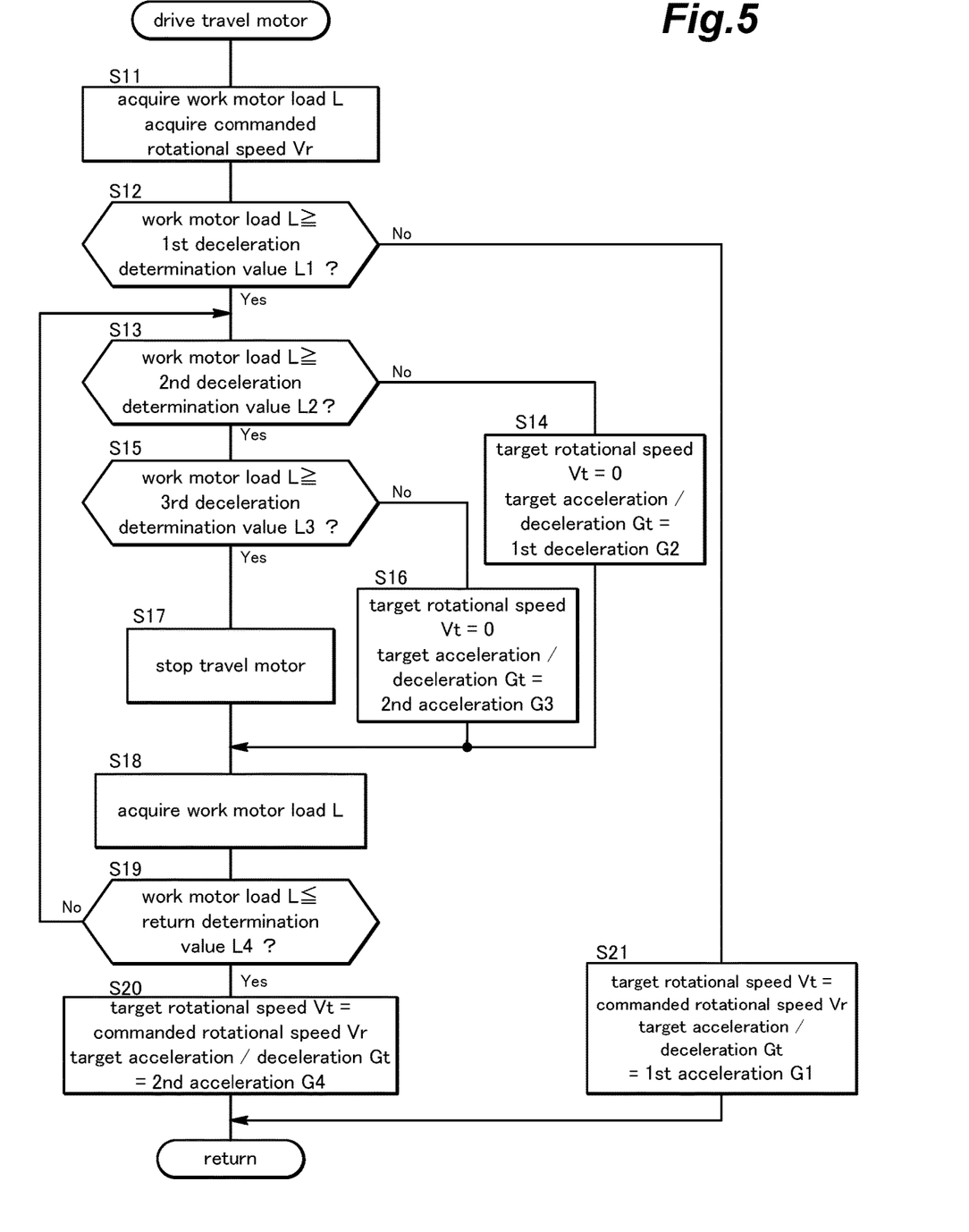
FIG. 5 is a flowchart showing a control process for travel motors performed by the control unit.

A drive control of the travel motors 9L and 9R is performed according to the control flow shown in FIG. 5. In the travel motor drive control, the control unit 10 firstly acquires a work motor load L [N·m] and a commanded rotational speed Vr [rpm] of the travel motors 9L and 9R in step S11.

In step S12 that follows, the control unit 10 determines if the work motor load L is equal to or greater than a first deceleration determination value L1. The first deceleration determination value L1 is a predetermined value indicating that the work motor load L is relatively high compared to a normal state, for instance greater than a normal load value by 10%. For example, when the normal load is 5 N·m, the first deceleration determination value L1 may be 5.5 N·m.

If the determination result in step S12 is No, the control unit 10 sets a target rotational speed Vt of the travel motors 9L and 9R to a commanded rotational speed Vr, and sets the target acceleration/deceleration Gt for reaching the target rotational speed Vt to a first acceleration G1 in step S21 so that the left and right travel motor drivers 32 and 33 are commanded to achieve the target rotational speed Vt at the target acceleration/deceleration Gt. At this time, the control unit 10 acquires the rotational speed V1 of the left and right travel motors 9L and 9R based on the output signals of the left and right travel motor rotational angle sensors 35 and 36. When the rotational speed V1 has reached the target rotational speed Vt, the target acceleration/deceleration Gt is set to 0, and a feedback control is performed so that the rotational speed V1 is maintained at the target rotational speed Vt.

When the determination result in step S12 is Yes, the control unit 10 determines if the work motor load L is equal to or greater than a second deceleration determination value L2 in step S13. The second deceleration determination value L2 is greater than the first deceleration determination value L1. For example, when the first deceleration determination value L1 is set to 5.5 N·m, the second deceleration determination value L2 may be set to 6.5 N·m.

When the determination result in step S13 is No, the control unit 10 sets the target rotational speed Vt of the travel motors 9L and 9R to zero in step S14, and sets the target acceleration/deceleration Gt for reaching the target rotational speed Vt (=0) to a first deceleration G2. Therefore, the rotational speed of the travel motors 9L and 9R gradually diminishes. The control unit 10 then controls the left and right travel motor drivers 32 and 33 so as to reach the target rotational speed Vt at the first deceleration G2. The process in step 14 is named as "first deceleration control".

When the determination result in step S13 is Yes, the control unit 10 determines if the work motor load L is equal to or greater than a stop determination value L3 in step S15. The stop determination value L3 is set to a value greater than the second deceleration determination value L2. For example, when the second deceleration determination value L2 is set to 6.5 N·m, the stop determination value L3 may be set to 7.5 N·m.

If the determination result in step S15 is No, the control unit 10 sets the target rotational speed Vt of the travel motors 9L and 9R to zero in step S16, and sets the target acceleration/deceleration Gt for reaching the target rotational speed Vt (=0) to a second deceleration G3 so that the left and right travel motor drivers 32 and 33 are commanded to achieve the target rotational speed Vt at the target acceleration/deceleration Gt. The second deceleration G3 is set to a value greater than the first deceleration G2 in value in the deceleration direction. For example, the first deceleration G2 may be 200 rpm/s, and the second deceleration G3 may be 250 rpm/s. The process in step S16 is named as "second deceleration control".

If the determination result in step S15 is Yes, the control unit 10 controls the left and right travel motor drivers 32 and 33 so as to bring the travel motors 9L and 9R to come to a stop in step S17. The deceleration of the travel motors 9L and 9R in coming to a stop is preferably sufficiently greater than the second deceleration G3. The process in step S17 is named as "stop control".

After performing the processing of any one of steps S14, S16 and S17, the control unit 10 again acquires the work motor load L in Step S18.

In step S19 that follows step S18, the control unit 10 determines if the work motor load L is equal to or less than a return determination value L4 in step S18. The return determination value L4 is selected as a value smaller than the first deceleration determination value L1. For example, when the first deceleration determination value L1 is set to 5.5 N·m, the return determination value L4 may be set to 5.0 N·m.

If the determination result of step S19 is No, the control flow returns to step S13 to repeat the processing of steps S13 to S16 until the determination result in step S19 becomes Yes. If the determination result in step S19 is Yes, in step S20, the target rotational speed Vt of the travel motors 9L and 9R is set to the commanded rotational speed Vr, and the target acceleration/deceleration Gt for reaching the target rotational speed Vt is set to the second acceleration G4 so that the left and right travel motor drivers 32 and 33 are commanded to achieve the target rotational speed Vt at the target acceleration/deceleration Gt. At this time, the control unit 10 acquires the rotational speed V1 of the left and right travel motors 9L and 9R according to the signals from the left and right travel motor rotational angle sensors 35 and 36. When the rotational speed V1 reaches the target rotational speed Vt, the target acceleration/deceleration Gt is set to zero, and a feedback control is performed so that the rotational speed V1 is maintained at the target rotational speed Vt. The second acceleration G4 is set to a value greater in value than the first acceleration G1. For example, the first acceleration G1 may be 100 rpm/s, and the second acceleration G4 may be 150 rpm/s. The process in step S20 may be called as "return control".

By performing the control flow shown in FIGS. 4 and 5, the electric lawn mower 1 operates as discussed in the following. When the work lever 16 is turned on by pressing the work lever 16 against the cross bar grip 13, the work motor 8 is driven, and the blade 3A rotates at a rotational speed VB so that lawn mowing can be performed. When the travel lever 15 is turned on in addition to the work lever 16, the travel motors 9L and 9R start driving the rear wheels 5 so that the electric lawn mower 1 travels forward at a certain speed. In the illustrated embodiment, when the electric lawn mower 1 travels forward, the blade 3A necessarily rotates.

Figure 6:
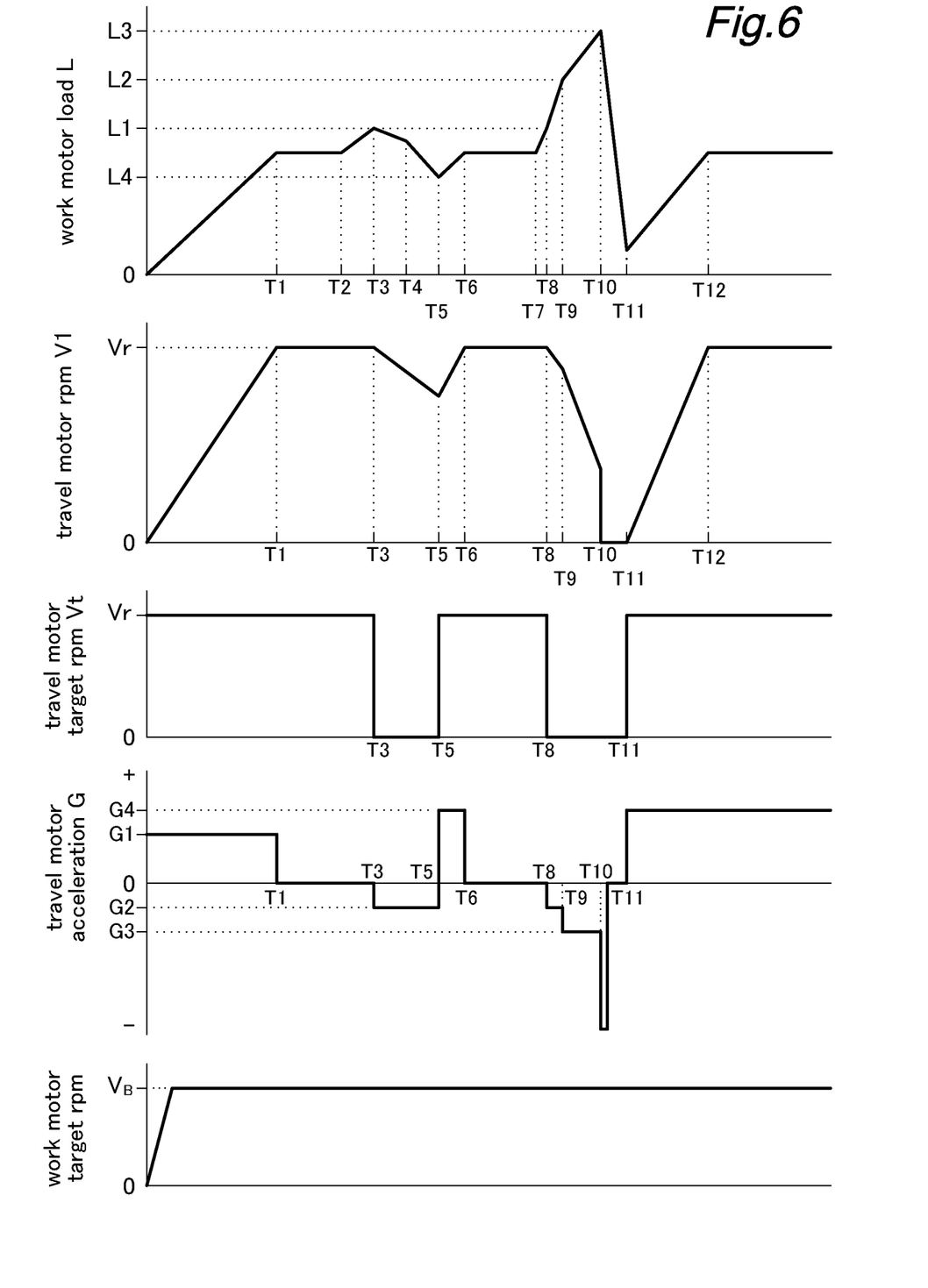
FIG. 6 is a time chart of a work motor load, a travel motor rotational speed, a target rotational speed of a travel motor, an acceleration/deceleration of the travel motor and a rotational speed of the work motor.

Referring to FIG. 6, the mode of operation of the electric lawn mower 1 passing through heavy work areas where a large amount of grass has to be cut is discussed in the following. Suppose that the electric lawn mower 1 passes through a heavy work area from time T2 to T4, and from time T7 to T11. At time T0, the travel lever 15 and the work lever 16 of the electric lawn mower 1 are turned on. As a result, the control unit 10 drives the work motor 8 at a constant rotational speed VB, and drives the left and right travel motors 9L and 9R with a commanded rotational speed Vr set as a target rotational speed Vt and the acceleration G of the left and right travel motors 9L and 9R set to the first acceleration G1. The rotational speed V1 of the travel motors 9L and 9R reaches the commanded rotational speed Vr at time T1, and the control unit 10 thereafter maintains the rotational speed V1 of the travel motors 9L and 9R at the commanded rotational speed Vr while maintaining a zero acceleration G for the travel motors 9L and 9R.

When the electric lawn mower 1 enters the heavy work area at time T2, the amount of grass that is required to be cut by the blade 3A increases, and the work motor load L increases. When the work motor load L becomes equal to or greater than the first deceleration determination value L1 at time T3, the control unit 10 performs the first deceleration control by driving the travel motors 9L and 9R with the target rotational speed Vt set to zero and the acceleration/deceleration G of the travel motors 9L and 9R set to the first deceleration G2. As a result, the rotational speed of the left and right travel motors 9L and 9R and the travel speed of the electric lawn mower 1 are reduced so that the amount of grass that is to be cut by the blade 3A in a unit time decreases, and the work motor load L decreases. Once the electric lawn mower 1 leaves the heavy work area at time T4, the work motor load L is further reduced.

When the work motor load L becomes equal to or less than the return determination value L4 at time T5, the control unit 10 performs the return control, and commands the travel motors 9L and 9R to operate with the target rotational speed Vt set to the commanded rotational speed Vr and the acceleration/deceleration G set to the second acceleration G4 so that the rotational speed of the travel motors 9L and 9R is restored to the rotational speed prior to entering the heavy load area. As a result, the rotational speed of the left and right travel motors 9L and 9R and hence the travel speed of the electric lawn mower 1 increase, and the work motor load L increases. Once the rotational speed V1 of the travel motors 9L and 9R has returned to the commanded rotational speed Vr (which coincides with the rotational speed prior to entering the heavy load area) at time T6, the control unit 10 maintains the rotational speed V1 at the commanded rotational speed Vr, and sets the acceleration/deceleration G to zero.

When the electric lawn mower 1 enters the second heavy work area at time T7, the work motor load L sharply increases. When the work motor load L becomes equal to or greater than the first deceleration determination value L1 at time T8, the control unit 10 performs the first deceleration control by commanding the travel motors 9L and 9R to operate with the target rotational speed Vt set to zero and the acceleration/deceleration G set to the first deceleration G2. As a result, the rotational speed of the left and right travel motors 9L and 9R and hence the travel speed of the electric lawn mower 1 are decreased, and the increase rate of the work motor load L is reduced. When the work motor load L continues to increase even though the rotational speed of the left and right travel motors 9L and 9R is decreased, and becomes equal to or greater than the second deceleration determination value L2 at time T9, the control unit 10 performs the second deceleration control by commanding the left and right travel motors 9L and 9R to operate with the target rotational speed Vt set to zero and the acceleration/deceleration G set to the second deceleration G3. As a result, the left and right travel motors 9L are 9R are further decelerated. When the work motor load L further continues to increase until the work motor load L becomes equal to or greater than the stop determination value L3 at time T10, the control unit 10 performs the stop control by stopping the left and right travel motors 9L and 9R altogether. As a result of this control, the electric lawn mower 1 stops traveling, but continues to rotate the blade 3A at the same spot to continue cutting the grass. This causes the work motor load L to rapidly decrease.

When the work motor load L becomes equal to or lower than the restoration determination value L4 at time T11, the control unit 10 performs the restoration control by commanding the left and right travel motors 9L and 9R to operate with the target rotational speed Vt set to the commanded rotational speed Vr and the acceleration/deceleration G set to the second acceleration G4. As a result, the rotational speed of the left and right travel motors 9L and 9R and hence the travel speed of the electric lawn mower 1 increase, and the work motor load L increases. After the rotational speed V1 of the travel motors 9L and 9R has reached the commanded rotational speed Vr at time T12, the control unit 10 maintains the acceleration/deceleration G at zero and maintains the rotational speed V1 at the commanded rotational speed Vr.

As discussed above, the rotational speed of the travel motors 9L and 9R that corresponds to the travel speed of the electric lawn mower 1 is determined according to the commanded rotational speed Vr which is selected by the operator, and the work motor load L. When the work motor load L is less than the first deceleration determination value L1, the travel motors 9L and 9R are operated so that the rotational speed thereof is equal to the commanded rotational speed Vr. When the work motor load L is equal to or greater than the first deceleration determination value L1, the travel motors 9L and 9R are operated so that the rotational speed thereof is lower than the commanded rotational speed Vr. When the rotational speed of the travel motors 9L and 9R is thus reduced, and the travel speed of the electric lawn mower 1 is thereby reduced, the amount of grass cut by the blade 3A per unit time decreases, and the work motor load L decreases owing to this control process. The rotational speed of the travel motors 9L and 9R is decelerated until the work motor load L becomes equal to or less than the return determination value L4. Owing to this control action of the control unit 10, the work motor load L is prevented from excessively increasing so that the rotational speed of the work motor 8 is prevented from excessively decreasing. As a result, the blade 3A can be maintained substantially at the constant rotational speed VB, and the grass can be cut with a high level of quality.

Because the control unit 10 is provided with the first deceleration determination value L1 for determining the timing at which deceleration of the travel motors 9L and 9R is initiated and the return determination value L4 for determining the timing for ceasing the deceleration so that the deceleration is continued from the time at which the work motor load L has become equal to or greater than the deceleration determination value L1 until the time at which the work motor load L has become equal to or less than the return determination value L4, hunting in the control action is prevented from occurring.

Because the control unit 10 changes the rotational speed of the work motors 9L and 9R when the work motor load L has exceeded or fallen below prescribed values such as the first deceleration determination value L1, the second deceleration determination value L2 and the return determination value L4 at the corresponding rates (acceleration/deceleration), sudden deceleration and acceleration of the electric lawn mower 1 can be avoided, and the operator is enabled to operate the electric lawn mower 1 in a comfortable manner.

Because multiple deceleration determination values (the first deceleration determination value L1 and the second deceleration determination value L2 in the illustrated embodiment) are provided so that a greater deceleration may be achieved with an increase in the work motor load L, the rotational speed of the work motors 9L and 9R can be reduced whenever appropriate in a prompt manner.

Further, the control unit 10 completely stops the travel motors 9L and 9R when the work motor load L becomes equal to or greater than the stop determination value L3 which is selected as a value greater than the second deceleration determination value L2 so that the work motor load L can be reduced particularly promptly.

Although the present invention has been described in terms of a preferred embodiment thereof, it is obvious to a person skilled in the art that various alterations and modifications are possible without departing from the scope of the present invention. For instance, the electric lawn mower 1 was provided with a pair of rear wheels 5 that are individually driven by the right and left travel motors 9R and 9L, but may also be provided with a single travel motor for driving both of the rear wheels 5.

Also, the present invention can be applied not only to lawn mowers but also to grass trimmers, snow blowers, tillers and other kinds of electric power equipment fitted with a power propulsion device. In the case of a snow blower, the work unit may include an auger for snow removal. In the case of a tiller, the work unit may comprise a rotary tiller blade.

When the load L becomes equal to or lower than a predetermined second return determination value L5 that is smaller than the stop determination value L3 and greater than the second deceleration determination value L2 during the stop control in which the travel motors 9L and 9R are stopped, the control unit 10 may preferably perform a low rotational speed operation control to increase the rotational speed of the travel motors 9L and 9R to a prescribed low rotational speed VL that is lower than the rotational speed thereof prior to the deceleration control (i.e., the commanded rotational speed Vr). Thereby, the time period during which the travel motors 9L and 9R are stopped under the stop control can be minimized so that the work efficiency can be improved.

In the above embodiment, the rotational speed of the travel motors 9L and 9R was changed according to the work motor load L detected by the load detection unit 41 as a current flowing through the work motor 8 or as an output signal from the magnetostrictive torque sensor. However, instead of or in addition to the current flowing through the work motor 8 or the output signal from the magnetostrictive torque sensor, the work motor load L may be represented by the rotational speed of the work motor 8 in such a high load condition that the rotational speed of the work motor 8 cannot be maintained at a constant value but is decreased in accordance with an increase in the work motor load. In this case, the various determination values may be defined in terms of the rotational speed of the work motor.

The invention claimed is:

1. Electric power equipment, comprising:
a work unit for performing prescribed work;
a work motor for driving the work unit;
a travel unit for enabling the electric power equipment to travel on a ground surface;
a travel motor for driving the travel unit;
a load detection unit for detecting a load acting on the work motor; and
a control unit for controlling operation of the work motor and the travel motor, the control unit being configured to maintain a rotational speed of the work motor at a constant value;
wherein the control unit is further configured to decrease a rotational speed of the travel motor in response to an increase in the load,
wherein the control unit is configured to perform a deceleration control whereby the rotational speed of the travel motor is decelerated at a prescribed deceleration when the detected load is equal to or greater than a deceleration determination value, and when the load has become equal to or smaller than a return determination value that is smaller than or equal to the deceleration determination value during the deceleration control, to perform a return control whereby the rotational speed of the travel motor is returned to a value thereof prior to the preceding deceleration control by accelerating the travel motor at a prescribed acceleration,
wherein the control unit is configured such that when the load has become equal to or greater than a stop determination value that is greater than the deceleration determination value during the deceleration control, the control unit performs a stop control to stop the travel motor, and when the load has become equal to or smaller than the return determination value during the stop control, the control unit performs the return control whereby the rotational speed of the travel motor is returned to the value thereof prior to the preceding deceleration control by accelerating the travel motor at the prescribed acceleration, and
wherein the control unit is configured such that when the load has become equal to or smaller than a second return determination value that is greater than the return determination value and smaller than the stop determination value during the stop control, the control unit performs a low rotational speed operation control whereby the rotational speed of the travel motor is increased to a prescribed low rotational speed that is lower than the rotational speed thereof prior to the deceleration control.

2. The electric power equipment according to claim 1, wherein the deceleration determination value comprises a plurality of deceleration determination values, and the deceleration control is performed so that the prescribed deceleration is increased with an increase in the deceleration determination value.

3. The electric power equipment according to claim 1, wherein the work unit comprises a rotary blade driven by the work motor and form a part of a lawn mower.

4. The electric power equipment according to claim 1, wherein the control unit is configured to increase the rotational speed of the travel motor in response to a decrease in the load applied to the work motor.

* * * * *